US012469244B2

(12) United States Patent
Kondiparthi et al.

(10) Patent No.: US 12,469,244 B2
(45) Date of Patent: Nov. 11, 2025

(54) SYSTEM AND METHOD FOR MAKING RELIABLE STITCHED IMAGES

(71) Applicant: Connaught Electronics Ltd., Tuam (IE)

(72) Inventors: Mahesh Kondiparthi, Chennai (IN); Fergal O'malley, Tuam (IE)

(73) Assignee: CONNAUGHT ELECTRONICS Ltd., Tuam (IE)

(*) Notice: Subject to any disclaimer, the term of this patent is extended or adjusted under 35 U.S.C. 154(b) by 517 days.

(21) Appl. No.: 17/917,719

(22) PCT Filed: Apr. 7, 2021

(86) PCT No.: PCT/EP2021/059073
§ 371 (c)(1),
(2) Date: Oct. 7, 2022

(87) PCT Pub. No.: WO2021/204881
PCT Pub. Date: Oct. 14, 2021

(65) Prior Publication Data
US 2023/0162464 A1 May 25, 2023

(30) Foreign Application Priority Data
Apr. 9, 2020 (DE) ............ 10 2020 109 997.5

(51) Int. Cl.
G06K 9/00 (2022.01)
G06T 5/70 (2024.01)
(Continued)

(52) U.S. Cl.
CPC ............ G06V 10/16 (2022.01); G06T 5/70 (2024.01); G06V 10/82 (2022.01); G06V 20/58 (2022.01);
(Continued)

(58) Field of Classification Search
CPC ......... G06T 3/4038; G06T 2207/20221; G06T 2207/30252; H04N 23/698
See application file for complete search history.

(56) References Cited

U.S. PATENT DOCUMENTS 9,509,909 B2 11/2016 Liu et al.
2009/0110327 A1 4/2009 Chen et al.
(Continued)

FOREIGN PATENT DOCUMENTS

DE 102016124978 A1 6/2018
DE 102019126814 A1 4/2021
(Continued)

OTHER PUBLICATIONS

Flores, Arturo, and Serge Belongie. "Removing pedestrians from google street view images." 2010 IEEE computer society conference on computer vision and pattern recognition-workshops. IEEE, 2010. (Year: 2010).*
(Continued)

Primary Examiner — Gregory A Morse
Assistant Examiner — Owais Iqbal Memon
(74) Attorney, Agent, or Firm — Osha Bergman Watanabe & Burton LLP

(57) ABSTRACT

A method, for detecting an artefact in a stitched image, comprises: acquiring component images of an environment from respective vehicle mounted cameras with overlapping fields of view; forming (410) a stitched image from the component images; processing (420) at least a portion of the stitched image corresponding to the overlapping field of view with a classifier to provide a list of detected objects from the environment at respective locations in the stitched image; determining (430) whether any detected object in the
(Continued)

list of detected objects is a duplicate of another object in the list of detected objects; and reporting any objects that are determined to be duplicates.

13 Claims, 9 Drawing Sheets

(51) Int. Cl.
*G06V 10/10* (2022.01)
*G06V 10/82* (2022.01)
*G06V 20/58* (2022.01)
*H04N 5/265* (2006.01)
*H04N 7/18* (2006.01)

(52) U.S. Cl.
CPC ... *H04N 5/265* (2013.01); *G06T 2207/20084* (2013.01); *G06T 2207/20221* (2013.01); *G06T 2207/30168* (2013.01); *G06T 2207/30252* (2013.01); *H04N 7/181* (2013.01)

(56) References Cited

U.S. PATENT DOCUMENTS

| | | |
|---|---|---|
| 2012/0262580 A1 | 10/2012 | Huebner et al. |
| 2013/0093851 A1 | 4/2013 | Yamamoto et al. |
| 2013/0286193 A1 | 10/2013 | Pflug |
| 2015/0138312 A1* | 5/2015 | Liu ................ H04N 23/84 348/36 |
| 2018/0253875 A1 | 9/2018 | Gorur Sheshagiri et al. |
| 2019/0325580 A1* | 10/2019 | Lukac ............... G06T 3/4038 |

FOREIGN PATENT DOCUMENTS

| | | |
|---|---|---|
| KR | 20200030603 A | 3/2020 |
| WO | 2016043837 A1 | 3/2016 |
| WO | 2020169693 A1 | 8/2020 |

OTHER PUBLICATIONS

Ping, Yang, et al. "Application of image mosaics on vehicle monitoring system." IEEE 10th International Conference on Signal Processing Proceedings. IEEE, 2010. (Year: 2010).*

International Search Report and Written Opinion in corresponding International Application No. PCT/EP2021/059073, dated Jul. 29, 2021 (7 pages).

German Search Report in corresponding German Application No. 10 2020 109 997.5, dated Dec. 17, 2021 (5 pages).

Office Action Issued in Corresponding Korean Application No. 2022-7039149, dated Nov. 10, 2023. (15 Pages with English Translation).

Charles Herrmann et al., Object-Centered image stitching, ECCV 2018, p. 846-861, 8-14, dated Sep. 8, 2018. (16 Pages).

Arturo Flores et al., Removing Pedestrians from Google street View images, 2010 IEEE Computer Society Conference on Computer Vision and Pattern Recognition—Workshops, p. 53-58, 13-18, Dated Jun. 13, 2010 (6 Pages).

* cited by examiner

SYSTEM AND METHOD FOR MAKING RELIABLE STITCHED IMAGES

FIELD

The present application relates to a system and method for making reliable stitched images.

BACKGROUND

A stitched imaged is an image that combines at least two component images acquired from one or more cameras at different poses with overlapping fields of view to create an image with a larger or different field of view than the component images.

The stitching process can result in artefacts in the stitched image for example, ghosting effects, if images of the same object in component images map to different locations in the stitched image.

U.S. Pat. No. 9,509,909 describes a method for correcting photometric misalignment comprising extracting block samples from at least one of a composite view geometric look-up table, input fish-eye image and view overlapping region, selecting sample inliers from the extracted block samples, estimating optimal color gain for the selected block samples, performing refined adjustment based on the estimated color gain and applying color transform, and producing a composite surround view image.

US2018/0253875 describes a method for stitching images including selecting a stitching scheme from a set of stitching schemes based on one or more content measures of the component images and applying the selected stitching scheme.

DE102016124978A1 describes a method, to improve the recognizability of vertical objects on a display device of a driver assistance system of a motor vehicle using an additional projection surface in a virtual three-dimensional space to better represent one or more vertical objects on the display device.

US2012/0262580 describes a system that can provide a surround view from a vehicle by way of cameras positioned at various locations on the vehicle. The cameras can generate image data corresponding to the surround view, and a processing device can process the image data and generate the surround view.

US2009/0110327 describes a method to facilitate identification of a plane in a 3D coordinate system in which a 3D model is to be generated based on 2D images. A direction of extrusion for the plane and a region of interest in one of the 2D images is set, and the plane is extruded until the region of interest in the plane matches a corresponding region in a 2D image.

It is an object of the present invention to make stitched images more reliable without the limitations of previous work.

SUMMARY

The present invention is defined by the independent claim. The dependent claims provide further optional features.

In brief, a method is described to make stitched images more reliable. The method efficiently and accurately detects twin-effect artefacts, where an object in component images maps to separate discrete locations in a stitched image and enables an alert to be raised if the content in the stitched image is unreliable. In some embodiments, the detected artefacts are efficiently replaced in real-time with dynamic imposters to result in a reliable stitched image.

BRIEF DESCRIPTION OF THE DRAWINGS

Embodiments of the invention will now be described, by way of example, with reference to the accompanying drawings, in which.

DESCRIPTION

For many tasks involving driving vehicles, acquiring information about the local environment is important. One way that this can be performed is by analysing images from camera modules mounted on a vehicle. The images may then be stitched together to provide more convenient image to view.

Figure 1:
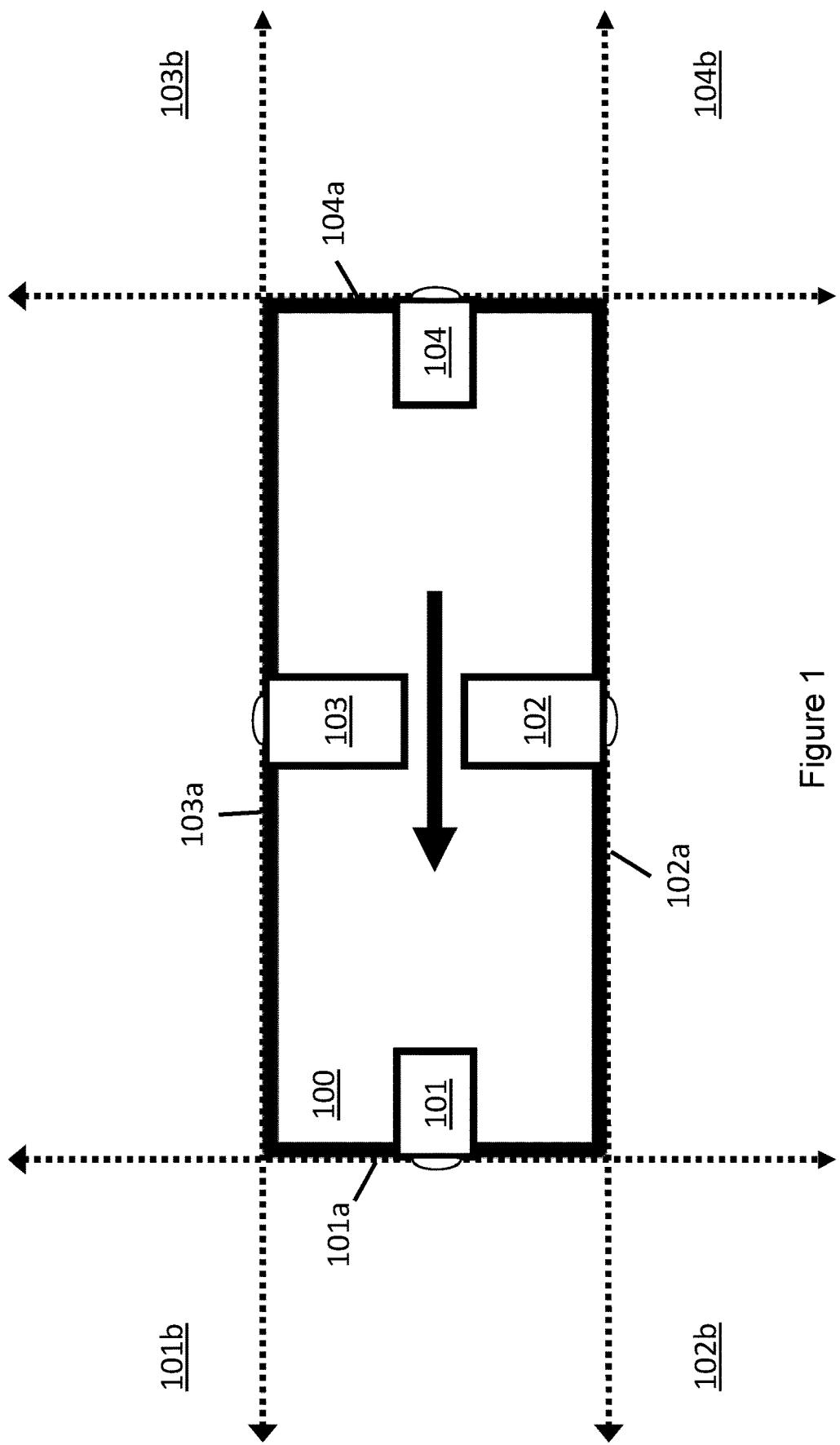
FIG. 1 shows a vehicle having several vehicle-mounted cameras.

When attempting to image the environment around a vehicle, one camera will generally not have an adequate field of view to acquire all the required data. One way to address this problem is to use multiple cameras. In FIG. 1, a vehicle 100 is shown with four cameras 101, 102, 103, 104 located around the periphery of the car. One edge of the field of view of each camera is marked with a dotted line 101a, 102a, 103a, 104a. Such a configuration of cameras results in fields of view that overlap in regions 101b, 102b, 103b, 104b. As an example, the region 102b represents the overlap between the field of view 101a of front facing camera 101 and the field of view 102a of left facing camera 102. The illustrated configuration is merely exemplary. The disclosed teachings are equally valid with other camera configurations.

The illustrated fields of view subtend approximately 180 degrees. A wide field of view is typically achieved by the camera having a wide field of view lens, such a fisheye lens. A fisheye lens is preferable as these are generally cylindrically symmetric. In other applications of the invention, the field of view may be less or more than 180 degrees. Whilst a fisheye lens is preferred, any other lens that provides a wide field of view can be used. In this context, a wide field of view is a lens having a field of view over 100 degrees, preferably over 150 degrees and more preferably over 170 degrees. Typically, cameras with such a wide field of view result in imaging artefacts and distortions in acquired images.

The sensitivity of the cameras used in the invention need not be limited to any specific range of wavelengths but most commonly it will be used with cameras that are sensitive to visible light. The camera will generally be in the form of a camera module comprising a housing for a lens and a sensor, the lens serving to focus light onto the sensor. The camera module may also have electronics to power the sensor and enable communication with the sensor. The camera module may also comprise electronics to process the image. The processing can be low level image signal processing, for example, gain control, exposure control, white balance, denoise, etc. and/or it can involve more powerful processing for example, for computer vision.

If the configuration of the cameras is such that it provides imagery from all directions around the vehicle, as in FIG. 1, their component images can provide enough information view to synthesize a stitched image from one of a variety of virtual camera poses, particularly from overhead the vehicle.

In the context of a vehicle having multiple cameras, such as shown in FIG. 1, it can be desirable to display a surround image, comprising a single image of the local environment from a point of view directly over the vehicle rather than multiple images from multiple cameras. Therefore, the images from all four cameras must be stitched together. The images can be mapped to a different surface before stitching is performed or as part of the stitching process. For example, component images can be mapped onto a spherical surface or a cylindrical surface before stitching. In one embodiment, the component images are mapped onto a flat-bottomed bowl surface before stitching. Such mappings can also take account of lens distortions and/or facilitate the stitching process.

At other times as in the example described below, for example, if a vehicle is about to make a left turn, it may be desirable to produce a stitched image from component images acquired from vehicle front 101 and left-side 102 cameras with a virtual camera pose located above the vehicle in order to more clearly illustrate an intersection to the driver. Similar stitched images from pairs of images can be generated when a vehicle is about to turn right or reverse around a corner.

Figure 2:
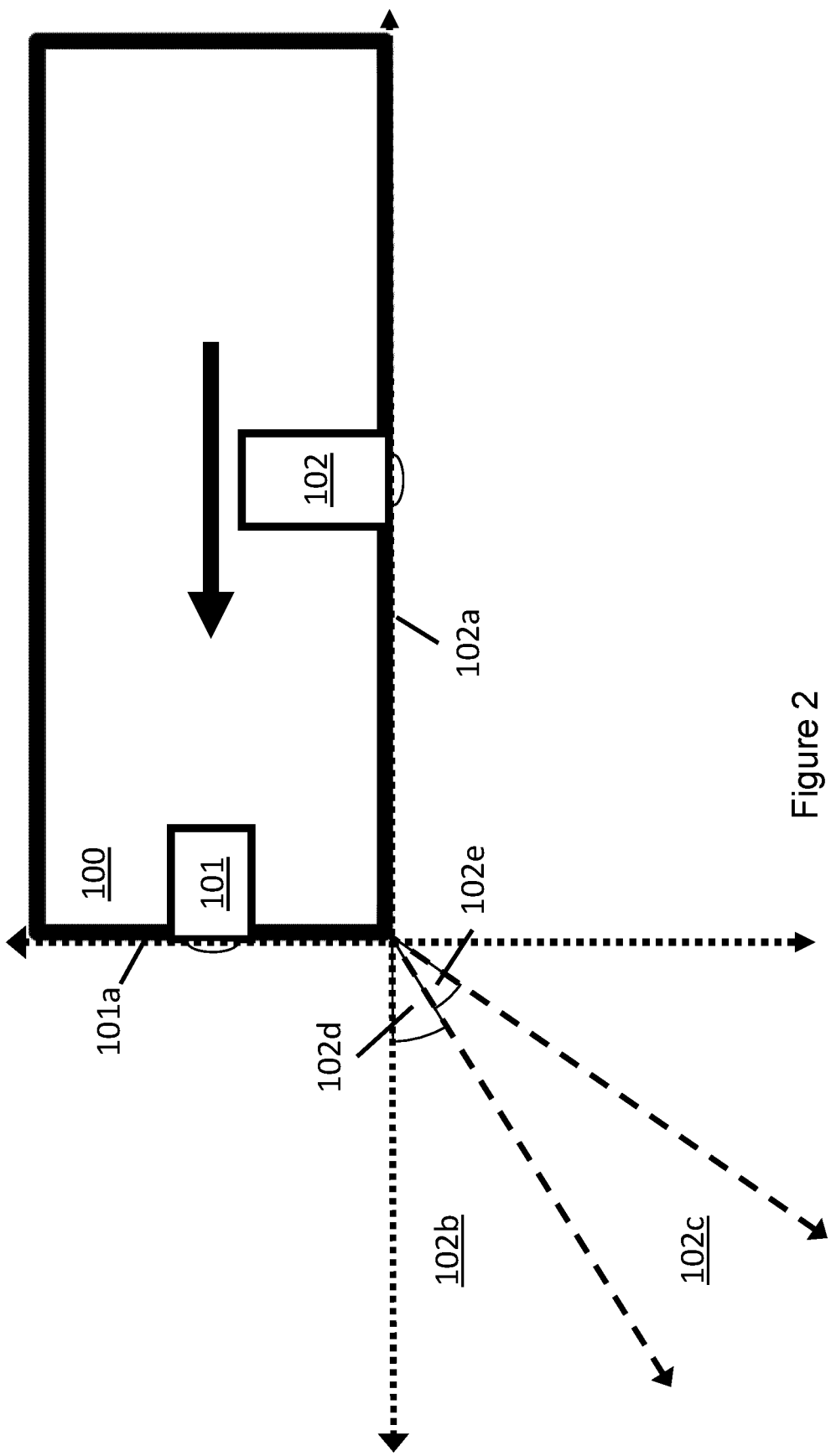
FIG. 2 shows in more detail the vehicle of FIG. 1 and an overlapping region between two cameras.

There are multiple known ways to stitch component images together. For example, direct stitching, linear blending, selective blending or multi-band blending. To describe these processes, we turn to FIG. 2, which shows further details of the vehicle shown in FIG. 1. In this FIG. 2, the overlapping region 102b has a blending segment 102c. The blending segment 102c is at least part of the overlapping region and is defined by two angles: angular offset 102d and angular width 102e. Data from any component image that lies within the blending segment 102c will be combined with data from another component image and the combined data used when forming the stitched image. The projection of a blending segment onto component images defines a blending region in the component images.

Direct stitching defines a line of transition in the overlapping region between two component images. Effectively, the angular width 102e is set to zero. The stitched image uses imagery from one component image on one side of the line and imagery from the other component image on the other side of the line. This stitching process results in a sudden transition between one component image to another. Consequently, artefacts may arise in the form of visible seams or discontinuities in the stitched image. In some cases, the likelihood or severity of artefacts can be reduced by known camera module harmonization techniques and devices such as those described in German Patent Application No. DE102019126814.1 (Ref: 2019PF00721) entitled "An electronic control unit" filed on 7 Oct. 2019.

A known variation on direct stitching is direct stitching using a dynamic seam. In this the direct stitching line is not necessarily straight but has a path that is adjusted according to the content of the stitched component images. This method may address some ghosting effects, but it is unlikely to address twin-effect artefacts, where a given object from the component images appears at separate discrete locations in the stitched image.

Linear blending adjusts pixel values in the blending region 102c by adjusting the pixel weight for one component image linearly with the distance across the blending region. The pixel values inside the blending region 102c are computed as the weighted average of the pixel values from the component images. Since the weights drop to zero gradually, a smooth transition is observed from one view to another instead of a sharp change. The problem with linear blending is that objects inside the blending region may be blurred due to imperfect object alignment between two different views. Therefore, a ghosting effect may be observed inside the blending area because of the blending of misaligned objects.

Selective blending uses both linear blending and direct stitching to find, for each pixel, synthesized pixel values $I_{linear}$ from linear blending and $I_{stitch}$ from direct stitching. Then, these synthesized pixel values are combined with a weight related to the difference between the two component image values at a considered location. The lower the difference, the higher linear blending is weighted, and vice versa. Selective blending avoids blending pixels corresponding to mismatched objects, and therefore may reduce blurring and ghosting effects. However, it fails when the mismatched objects have similar colours or the residual discrepancy after photometric alignment is still too big. Since the latter is one cause of twin-effect artefacts, selective stitching is not an ideal choice to address the twin-effect artefact. In other words, selective stitching is effective at nullifying ghosting effect for non-uniform colour objects but is unlikely to address the extreme disparities that lead to twin-effect artefacts.

Multi-band blending improves the appearance of the blending region in a stitched image by dividing the component images into sub-bands and adaptively blending the sub-bands. In an example, a frequency sub-band decomposition is applied to the blending region 102c. For a high frequency band, a first small blending region is applied. For a low frequency band, a second larger blending region is used. As a result, this operation averages over longer spatial range for low frequency components and over shorter spatial range for high frequency components. Since high frequency components may be better preserved with a smaller blending range, the result is a sharp rendering of the details in the blending region. However, multi-band blending does not address the ghosting problem for non-planar objects.

In all cases, there is a risk that significant twin-effect artefacts will be present in the stitched image. The likelihood or appearance of such twin-effect artefacts is increased when objects are present that have a high contrast with the background. Twin-effect artefacts are present in other cases but often have an insignificant visual impact. For example, twin-effect artefacts in the road and sky are rarely problematic—it is generally not a problem if two empty parts of a road have a duplicated texture.

The appearance of the twin-effect artefact is dependent on the stitching technique that is deployed and the stitching parameters. For example, variation of the size of the blending region in the overlapping region between component images can vary the appearance of a twin-effect artefact.

Figure 3:
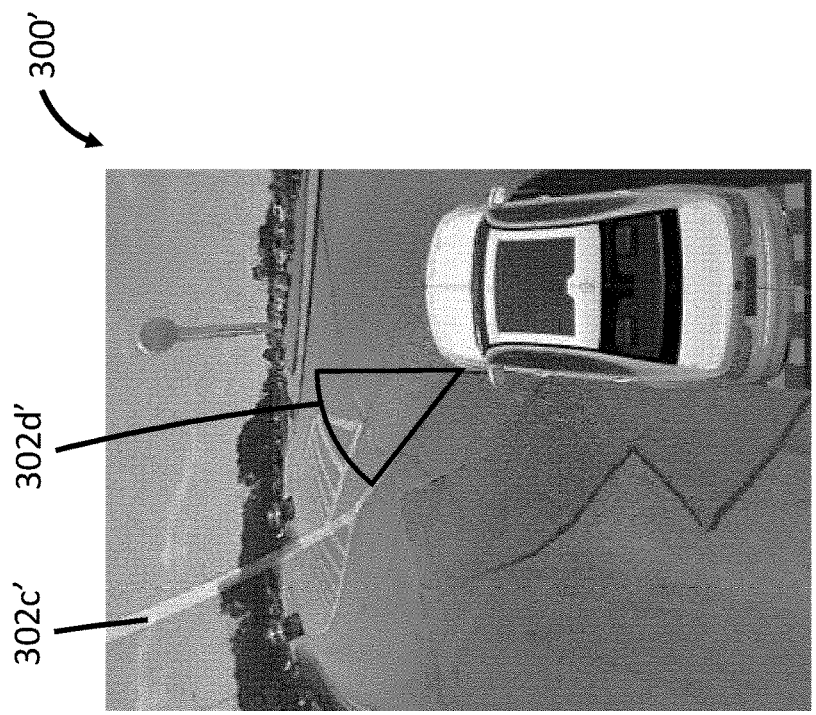
FIG. 3 shows two stitched images of the same scene with different blending regions highlighted.
Figure 3:
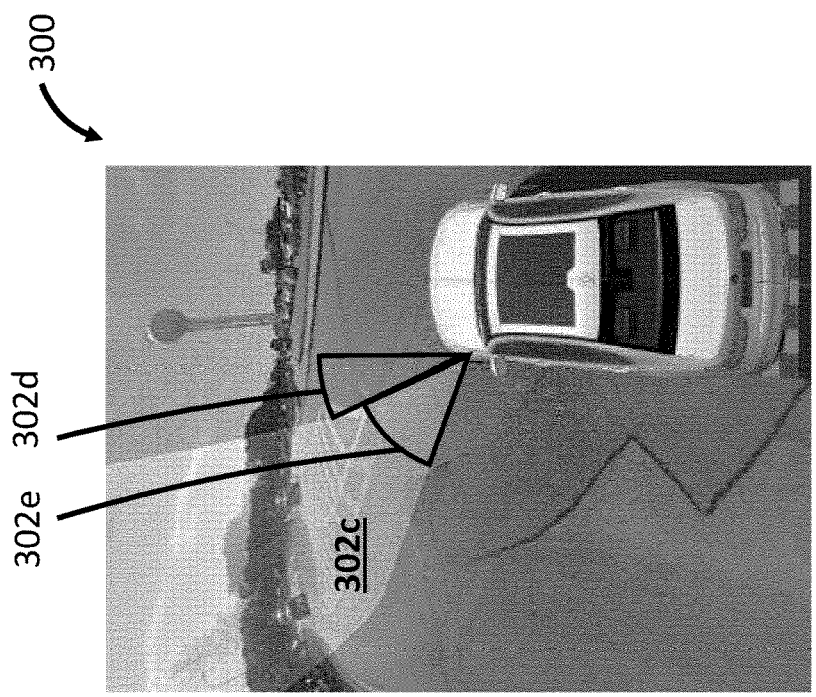

To demonstrate this variation, consider FIG. 3, which shows two images of portions of stitched images produced using two different stitching parameters respectively.

The stitching parameters that form the first image 300, on the left-hand side of FIG. 3, define a relatively wide blending region 302c. This blending region 302c is defined by angular width 302e and angular offset 302e. The angular offset is measured from the direction straight ahead of the car. The stitching parameters that form the second image 300', on the right-hand side of FIG. 3, define a different, relatively narrow, blending region 302c'.

When the component images used to produce the stitched images in FIG. 3 were acquired, there was only one car on the road ahead of the vehicle. However, a twin-effect artefact in the first image 300 results in the appearance of two partially transparent cars in the blended region 302c. Another twin-effect artefact is present in the second image 300' and results in the appearance of two cars in the same location as in the first image 300. However, in the second image 300' the two apparent cars are outside the blending region 302c' and are opaque. Direct stitching with a line down the middle of narrow blending region 302' would result in a similar image to the second 300'.

Traditionally, the blended region of component images can be considered as a cylindrical sector. As an example, consider the first image 300 in FIG. 3, in which the cylindrical sector extends the height of the image and is defined by the angular width 302e and the angular offset 302d. Since the appearance of twin-effect artefacts is dependent on stitching technique and stitching parameters, it is possible to reduce the likelihood of twin-effect artefacts and/or reduce the severity of the artefacts by adapting the stitching technique and stitching parameters. A layered, or stack, of cylindrical sectors offers a lot of freedom to mitigate twin-effect artefacts, as it offers more freedom and additional stitching parameters to adjust. As each layer is a cylindrical sector, it has two additional parameters of layer height, and layer thickness in addition to the angular width and angular offset.

Figure 4:
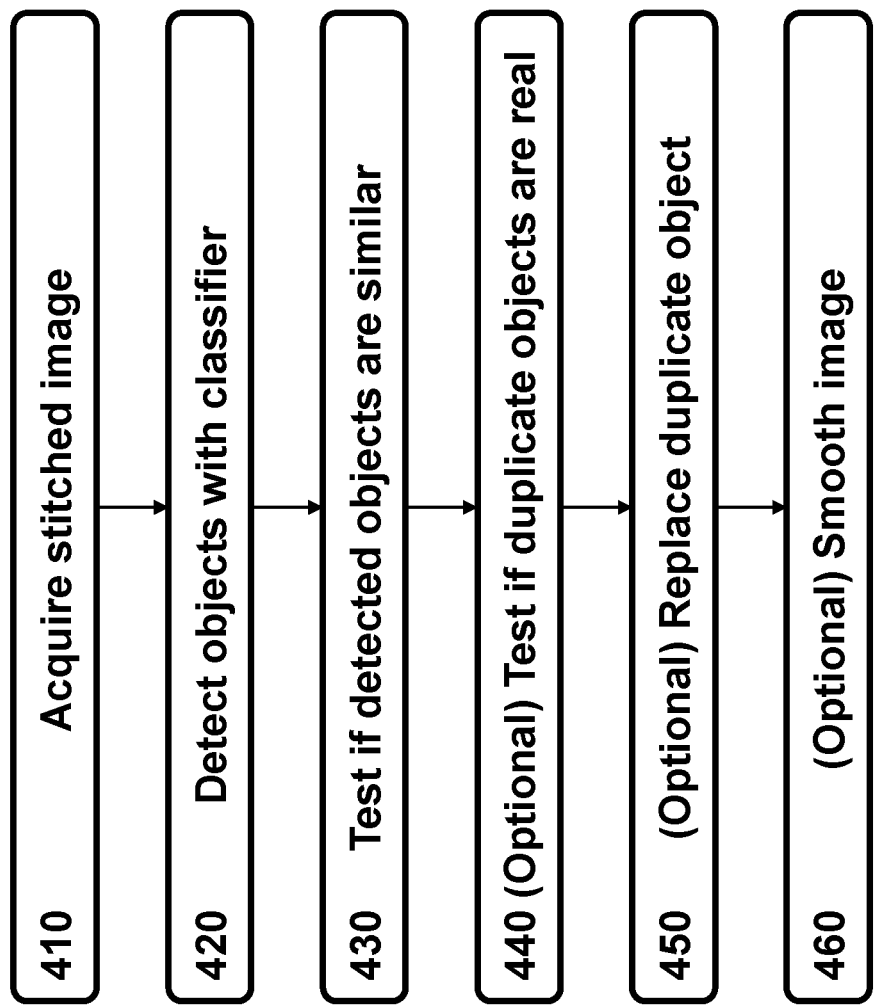
FIG. 4 shows methods to detect and address twin-effect artefacts according to an embodiment of the present invention.

Referring now to FIG. 4, a flow diagram describing an embodiment of the present invention is shown. The first step 410 is to acquire a stitched image and this can be done by combining component images from a pair of cameras with overlapping fields of view using any of the techniques described above. Nonetheless, embodiments of the invention can equally be applied to any stitched image in which a given object appearing in each of a pair of component images can map to discrete locations within the stitched image.

In any case, the stitched image is then processed to detect objects 420. This detection can be achieved by using a known object detecting classifier, such as a machine learning algorithm. In the embodiment, the classifier can process the stitched image directly, which means the process need only occur once for each stitched image. Alternatively, or in addition, the classifier can be used on each component image and the results combined by mapping the results of each component image to the stitched image.

Figure 5:
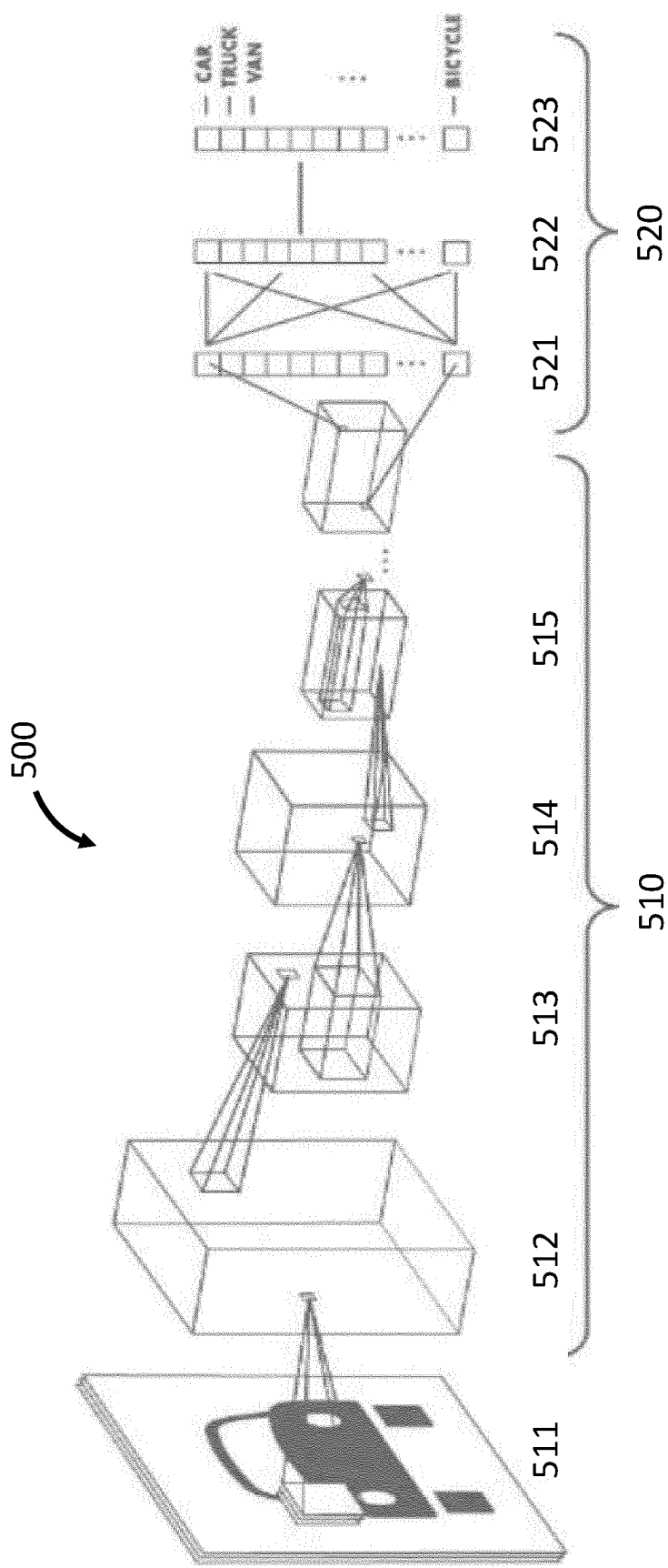
FIG. 5 shows a convolutional neural network, CNN, for labelling an image employed in the embodiment of FIG. 4.

In a preferred embodiment, a CNN is used to label the known objects in an image. An example of such a CNN is shown in FIG. 5. Various ways to train the CNN to detect known objects are known to the skilled person. Once trained, the CNN can process images and mark detected objects with appropriate labels. The label applied to a detected object will typically define a bounding box that encloses at least part of a detected object and the name of the known object that has been detected. The bounding box need not be rectangular and can be different shapes and sizes as is convenient. If the classifier is operated on component images, the mapping between the component images and stitched image may result in a bounding box being a different shape in the stitched image.

CNNs can detect known objects by processing an input 511 image with one or more convolution or pooling layers. In a convolution layer 512, one or more convolutional kernels pass over this image, and in a pooling layer 513 the spatial resolution of the processed data is reduced. In the example shown in FIG. 5, two convolutional layers 511 and 513 and two pooling layers 513 and 515 are used. In embodiments of the present invention, any number of convolutional or pooling layers may form hidden layers 510 of the CNN 400. The data from the hidden layers 510 is then processed by classification layers 520 to form the result. In the example shown in FIG. 5, the data from the hidden layers is flattened 521 to provide a feature vector which is then passed through a plurality of fully connected layers 522. In this case, a softmax operation 523 is performed to identify known objects in the image e.g. trucks, streetlight structures or cars.

Known alternative classifiers can also be used to detect known objects. In some embodiments, the classifiers may avail of information determined from other sensors, such as LiDAR sensors on the vehicle. When training classifiers, additional optional inputs like edge-enhanced or edge-images can also be input to help in situations where limited input images are available. For some classifiers, such additional inputs help decrease the complexity of the network, i.e. using additional inputs can reduce the number of layers in the hidden layers of the CNN.

Figure 6:
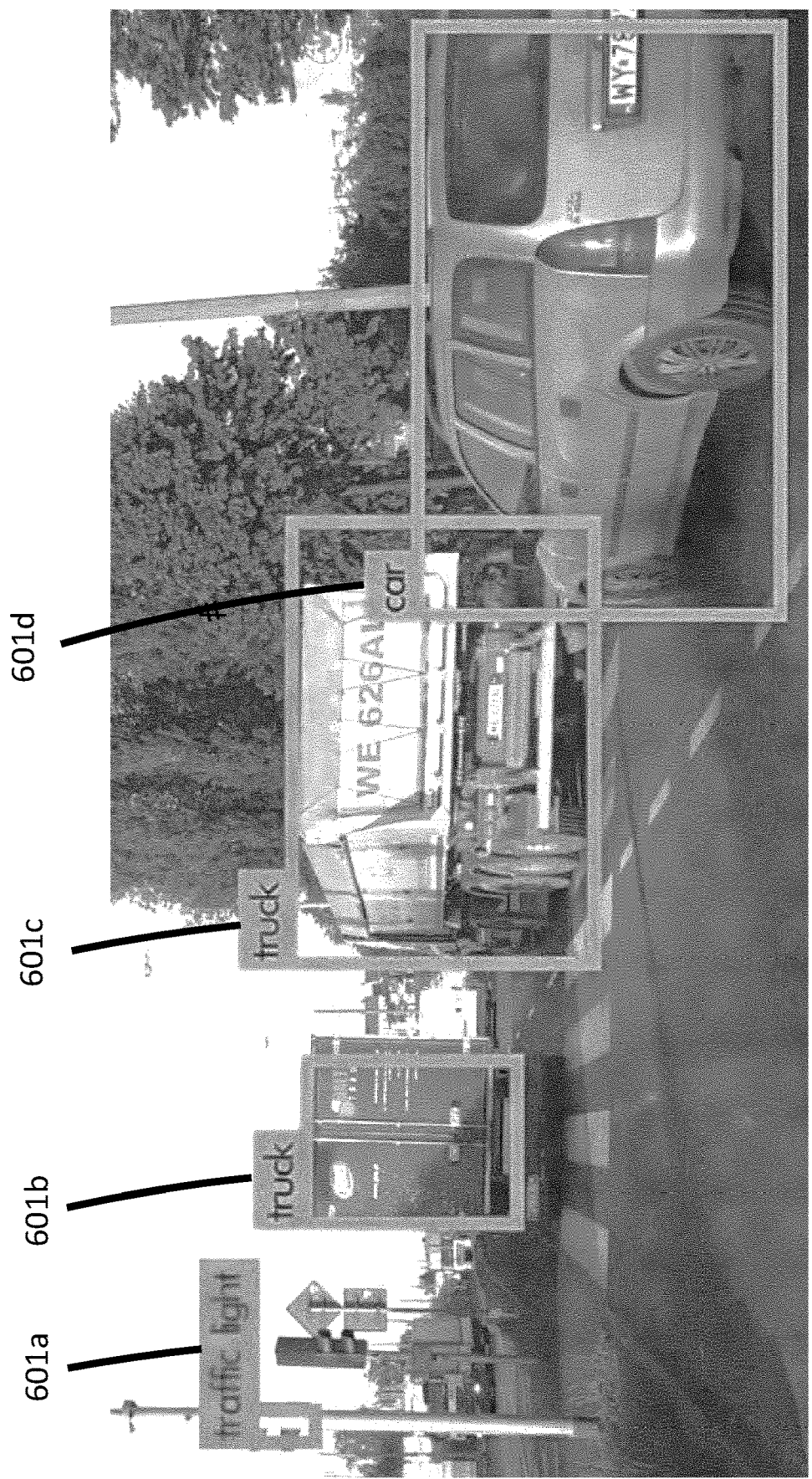
FIG. 6 shows an image with labels of detected known objects overlaid.

A typical output from a classifier is shown on the image in FIG. 6. The input image has several labels overlaid on the processed image, including a traffic light 601a, two trucks 601b and 601c and a car 601d. Each of the labels has an associated location and marks a bounding box that marks the region of the input image that the classifier considers to be associated with the labelled object.

Since the aim is to identify twin-effect artefacts in one or more overlapping regions, the region of the stitched image that is processed, the region of interest, ROI, can be limited to the overlapping regions of the stitched image i.e. the region of the stitched image in which the fields of view for the component images overlap. This reduction in the ROI speeds up processing significantly, reduces unwanted object detection, and greatly decreases the rate of false positives.

The ROI can be defined by the stitching technique and parameters. Parameters like stitching angle (e.g. angular width 302e and angular offset 302d in FIG. 3) can be used to define the ROI.

Once the objects have been detected, the detected objects are tested 430 to see if they are similar. In other words, the detected objects are processed to detect similarity between the content in bounding boxes. Normal duplicate content detection algorithms are computationally intensive. Due to the large distance between the object and camera, twin-effect artefacts present mostly as translational shifts. Therefore, the duplicated content assessment need not take all possible deformations into consideration. In some embodiments, a classifier, such as a CNN, is trained to detect twin-effect artefacts by focusing on duplication from translational shifts of content. Restricting to translational shifts, helps to minimize the number of false positives. False positives in this case are similar objects that are not due to twin-effect artefacts. Due to the narrow constraint imposed by testing only for translational shifts, the likelihood of false positives is significantly minimized. Training the classifier can be improved by taking into account the perspective change between one camera to another. This training improvement arises as the duplicate object from the twin-effect artefact may appear slightly different due to a perspective change.

Temporal signals can also help avoid false positives when detecting twin-effect artefacts. For example, duplicate objects arising due to a twin-effect artefact tend to move together and possibly even blend together as the objects approach the vehicle. This is not normally the case with other types of duplicated objects that may be detected.

The similarity test can be incorporated in the classifier that detects the objects, or it can be applied separately to a list of detected objects. In a preferred embodiment, after the objects in a stitched image are labelled, a CNN assesses the similarity of the labelled objects to detect duplicates. The result of the similarity test is that labelled objects that are similar are detected i.e. likely twin-effect artefacts are detected.

A further optional step is to test 440 whether a detected duplicated object is real. In some embodiments, this step comprises processing at least one of the component images to see if similar duplicated objects are detected in any one of the component images. If duplicate objects are present in any one of the component images, the duplicate objects are more likely not to be an artefact of stitching. This step helps ensure that two real similar objects are not erroneously labelled as twin-effect artefacts. This is important as objects that are duplicated due to artefacts can be ignored or subsequently removed from an image; whereas ignoring or removing real objects e.g. cars could be a serious mistake. Consequently, the test of whether apparently duplicated detected objects are real improves the reliability of the stitched image.

A number of options are available in response to detecting and optionally confirming that a stitched image contains twin-effect artefacts. These can involve as little as flagging that the stitched image may contain artefacts or in some cases, actively responding by attempting to correct the stitched image or preventing such artefacts occurring in subsequently generated stitched images.

So, for example, detection of an artefact can be reported to the driver to ensure the driver is alerted to potentially misleading information in the stitched image. For example, when parking a car, an alert may be issued to signal to a driver that two apparent nearby lamp posts appear to be due to a twin-effect artefact. The driver can then visually confirm in a mirror, which of the apparent lamp posts is most relevant and manoeuvre the car accordingly. The stitched image and the detected twin-effect artefacts can also be recorded and logged by a vehicle subsystem, such as a hard drive or other storage area.

The presence of twin-effect artefacts can also be reported to a machine learning algorithm that is configured to tune the stitching parameters to mitigate against twin-effect artefacts. In a preferred embodiment the machine learning algorithm that tunes the stitching parameters is a convolutional neural network, CNN.

In some cases, the stitched image content may simply be adjusted to mark the detected twin-effect artefact.

In the present embodiment, however, the content of the stitched image is adjusted before being displayed.

An imposter is a graphical artefact added to an image to better represent a missing or misrepresented object. As an example, consider FIG. 3 and note that all the vehicle mounted cameras are located around the periphery of the vehicle and face outwards. There is therefore no imagery from any vehicle mounted camera that would allow the vehicle to be well rendered in an image. The vehicles shown in the bottom right of the images in FIG. 3 are merely vehicle avatars that are superimposed in the correct location of the stitched image. Such avatars significantly improve the appearance of the stitched image and let drivers more easily visualize how a vehicle is orientated in the stitched image. The vehicle avatar is an example of a static imposter, which is an imposter that is generated, at least partially, prior to the method being performed and stored in memory for use when necessary. The downside of static imposter is that they require the replacement imagery to be known, or calculatable, beforehand. When it is not possible to use static imposters, dynamic imposters may be used. A dynamic imposter is an imposter that is generated at run time based at least in part on data determined from one or more cameras.

In some embodiments, the present invention addresses the detected twin-effect artefact using imposters. Specifically, at step 450 one of the duplicated objects is replaced with a dynamic imposter. The dynamic imposter comprises image data from a component image. For every twin-effect artefact, one of the component images supplies the data for one of the objects in the twin-effect artefact and the other component image supplies the data for the other object. Consequently, replacing the region of the stitched image detected as a twin-effect artefact with the data from the other component image will remove the twin-effect artefact.

Figure 7:
FIG. 7 shows further stitched images of the scene of FIG. 3 with respective blending regions marked. In the left-hand image, a twin-effect artefact of a car has been detected and marked. In the right-hand image, the detected twin artefact has been addressed.
Figure 7:
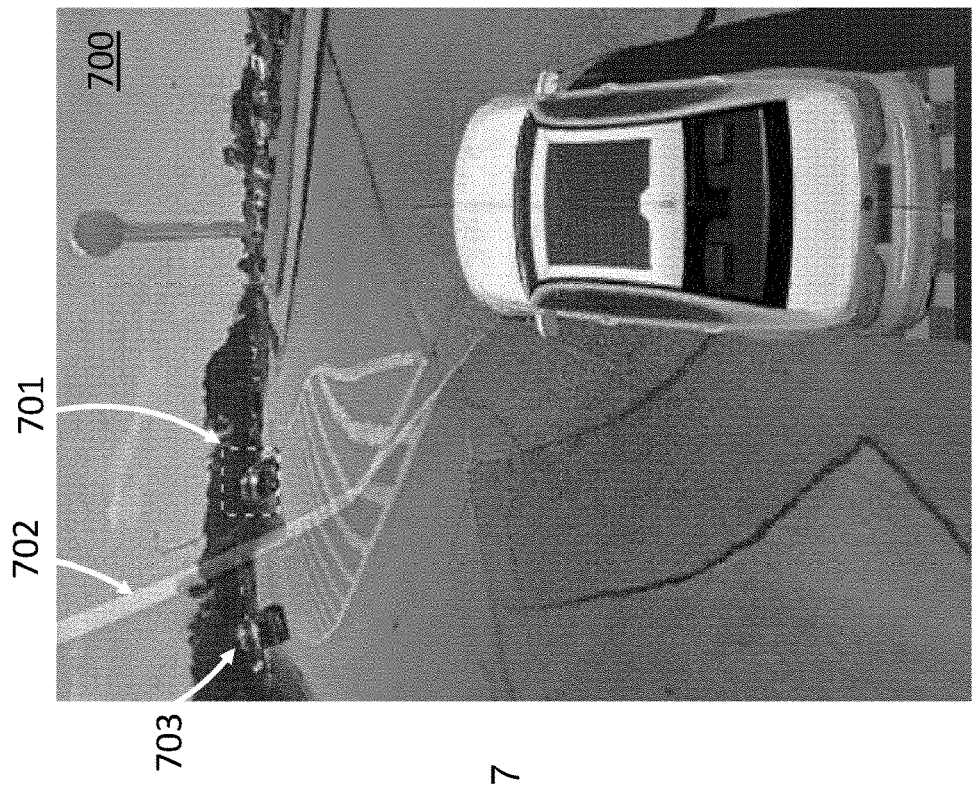
Figure 8:
FIG. 8 shows still further stitched images of the scene of FIG. 3 with respective blending regions marked. In the left-hand image, a twin-effect artefact of a street lighting structure has been detected and marked. In the right-hand image, the detected twin artefact has been addressed.
Figure 8:
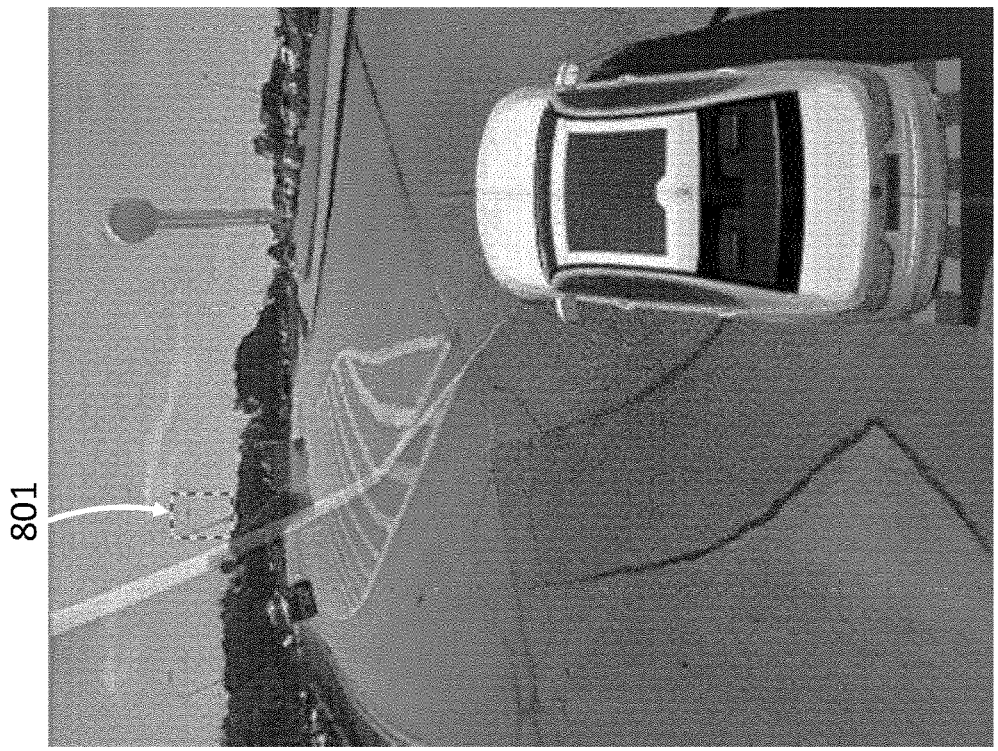

Two examples of this process are shown in FIGS. 7 and 8 respectively. In FIG. 7, the left-hand side image 700 contains a twin-effect artefact in the form of a duplicated car. The bounding box of the detected twin-effect artefact 701 is indicated in a white and black dashed box. In the stitched image, the data in the region to the below and left of the blended region 702 comes from the component image originating from the left-facing vehicle mounted camera. The data in the region above and right of the blended region 702 comes from the component image originating from the front-facing vehicle mounted camera. Consequently, the data to form the left-most car 703 object comes from the left-facing camera and the car in the bounding box of the detected twin-effect artefact 701 comes from the front-facing camera. On the right-hand side image 700', the data in the bounding box of the detected twin-effect artefact 701 has been replaced with data from the left-facing camera thus removing the twin-effect artefact. FIG. 8 shows the process occurring again because a street lighting structure was also ascertained to be a twin-effect artefact 801. Again, switching the data in the bounding box of the twin-effect artefact to data to the other component image addresses the twin-effect artefact.

Figure 9:
FIG. 9 shows the stitched image of FIG. 8 after detected twin-effect artefacts have been addressed.

The stitched result without apparent twin-effect artefacts is shown in FIG. 9. Further smoothing effects may be used to mask the edge regions that have been adjusted in the stitched images. For example, the imposters may be blended with the original stitched image to avoid sudden transitions in pixel values. In some embodiments, the smoothing effect may blur the edges of the imposters. Such smoothing effects help conceal the imposter in the stitched image.

Further processing of the stitched image may occur to refine the image. Additionally, separate processing may occur to remove different image artefacts. See, for example, German Patent Application No. 102019131971.4 (Ref: 2018PF02667) entitled "An image processing module" filed on 26 Nov. 2019. The removal of twin-effect artefacts beforehand prevents any subsequent processing enhancing the appearance of twin-effect artefacts.

The described method aims to reliably address distracting high-contrast twin-effect artefacts in stitched images. In contrast to other duplicated content finding methods, the described method does not waste resources detecting and/or eliminating twin-effect artefacts in needless areas e.g. correcting the appearance of a uniform road surface. Instead, the described methods focus on reliably mitigating against the most visually striking twin-effect artefacts (e.g. a second image of a car in a road ahead).

The described methods may help vehicle drivers trust stitched images. For example, consider a driver who is viewing a stitched image via a display mounted inside a vehicle e.g. a car driver maneuvering a car to park it by viewing a stitched image on a display screen mounted in the passenger compartment of a car. The described methods can either alert the driver to the presence of a displayed twin-effect artefact or remove the twin-effect artefact from the displayed image. In both cases, the displayed stitched image will be more reliable.

The considered vehicle could also be a self-driving vehicle i.e. an autonomous vehicle or a vehicle with driver assistive features. In this case, the accuracy of considered images is particularly important. For example, a vehicle control mechanism may base the vehicle control or driving recommendation on the stitched image. Therefore, by reporting twin-effect artefacts, or removing them, the vehicle control mechanism can take appropriate action. Therefore, by using the described methods, poor driving decisions that are made or recommended because of the twin-effect artefacts in stitched image can be reduced.

The alerts of detected twin-effect artefacts or corrected stitched images may also be recorded by a vehicle system. Recording may be in the form of keeping records in a media storage device e.g. a hard disk.

While the above described example has been provided in terms of stitching images acquired from vehicle front facing 101 and left-side 102 cameras, it will be appreciated that at other times, stitched views from other combinations of cameras with adjacent fields of view might be of interest and similarly the invention is equally extendible to creating surround view images stitched from component images acquired from all of the cameras 101 . . . 104 surrounding the vehicle.

The invention claimed is:

1. A method for detecting an artefact in a stitched image, comprising:
   acquiring component images of an environment surrounding a vehicle from respective vehicle mounted cameras with overlapping fields of view;
   forming a stitched image from the component images;
   processing at least a portion of the stitched image corresponding to the overlapping field of view with a classifier to provide a list of detected objects from said environment at respective locations in the stitched image;
   determining whether any detected object in the list of detected objects is a duplicate of another object in the list of detected objects;
   reporting any objects that are determined to be duplicates;
   selecting any reported duplicate object;
   responsive to the selected object appearing multiple times in a component image, marking the selected object as not a duplicate;
   correcting the stitched image for any of the objects that are determined to be duplicates to obtain a duplicate-free stitched image; and
   presenting the duplicate-free stitched image to a driver of the vehicle or providing the duplicate-free stitched image to a self-driving algorithm of the vehicle.

2. The method of claim 1, further comprising:
   for any reported duplicate object, replacing a region of the stitched image containing the reported duplicate object with an imposter from one of the component images.

3. The method of claim 2, wherein each detected object in the list of detected objects is defined by a bounding box and, wherein replacing a region of the stitched image containing the reported duplicate object with an imposter from one of the component images comprises replacing the reported duplicate object with an imposter of the same shape as the bounding box of the reported duplicate object.

4. The method of claim 2, wherein the at least a part of the imposter is blended with the original stitched image.

5. The method of claim 1, wherein forming a stitched image from the component images comprises:
   selecting multiple overlapping regions of two component images to define multiple blending regions;
   adjusting the shape or position of at least two blending regions of the multiple blending regions; and
   forming a stitched image from the two component images, including combining the data from the two component images in the multiple blending regions.

6. The method of claim 5, wherein adjusting the shape or position of at least two blending regions of the multiple blending regions comprises selecting stitching parameters that define the shape or position of at least two blending regions using a convolution neural network that has been trained by varying the stitching parameters and assessing whether artefacts are detected in the stitched images that result from respective sets of stitching parameters.

7. The method of claim 1, wherein any reported duplicate object is a stitching artefact that arises due to:
   an imaged object from a first vehicle mounted camera being mapped to a first location in the stitched image; and
   the imaged object from a second vehicle mounted camera being mapped to a second location in the stitched image, the second location being different to the first location by more than a threshold.

8. The method of claim 7, wherein the threshold is set so that the reported duplicate object does not overlap with the original object.

9. The method of claim 1, wherein the component images are acquired at the same time from two respective cameras.

10. The method of claim 1, wherein determining whether any detected object in the list of detected objects is a duplicate of another object in the list of detected objects comprises using a convolutional neural network to classify whether detected objects are duplicates, and wherein the convolutional neural network has been trained to identify a duplicate object as a translated duplicate of another object in the list of detected objects.

11. The method of claim 10, wherein the translated duplicate of another object is a translated duplicate of another object that has been adjusted to account for the perspective change between the vehicle mounted cameras.

12. The method of claim 1, wherein at least a portion of the stitched image comprises the regions of the stitched image that are formed from the data of more than one component image.

13. A vehicle comprising a camera module, the camera module being configured to perform the method according to claim 1.

* * * * *